US012184399B1

United States Patent
Momtahan et al.

(10) Patent No.: US 12,184,399 B1
(45) Date of Patent: Dec. 31, 2024

(54) LASER-SHARED COHERENT TRANSCEIVERS AND METHODS

(71) Applicant: Amazon Technologies, Inc., Seattle, WA (US)

(72) Inventors: Omid Momtahan, Palo Alto, CA (US); Aliasghar Eftekhar, Fremont, CA (US); Alaa Adel Mahdi Hayder, Sammamish, WA (US); Poorya Saghari, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 167 days.

(21) Appl. No.: 17/957,063

(22) Filed: Sep. 30, 2022

(51) Int. Cl.
*H04J 14/02* (2006.01)
*H04J 14/00* (2006.01)

(52) U.S. Cl.
CPC ........ *H04J 14/002* (2013.01); *H04J 14/0227* (2013.01)

(58) Field of Classification Search
None
See application file for complete search history.

(56) References Cited

U.S. PATENT DOCUMENTS 5,886,802 A * 3/1999 Majima ............... H04J 14/0241
398/95
5,886,803 A * 3/1999 Yamamoto .......... H04B 10/272
398/91

(Continued)

FOREIGN PATENT DOCUMENTS

WO WO-2019149342 A1 * 8/2019 ......... H04B 10/2507

OTHER PUBLICATIONS

Misra et al., Integrated High-Resolution Optical Spectrum Analyzer with Broad Operational Bandwidth, IEEE, 2020 (Year: 2020).*

(Continued)

*Primary Examiner* — Jai M Lee
(74) *Attorney, Agent, or Firm* — Klarquist Sparkman, LLP (57) ABSTRACT

An optical communication system comprises a plurality of linked single-wavelength coherent optical transceivers configured to communicate via short-reach data-center links at a common reference wavelength, each transceiver including a single single-wavelength laser source that is used to produce a source beam at a source beam wavelength, the source beam being used to produce transmit beams sent by the transceiver and for mixing with one or more receive beams received by the transceiver; wherein each of the transceivers includes a thermo-electric cooler configured to control a temperature of the single-wavelength laser source around a temperature setpoint that locks the source beam wavelength to the common reference wavelength; wherein each transceiver includes a wavelength deviation detector configured to detect a wavelength deviation between the source beam wavelength and the wavelength or wavelengths of the one or more receive beams or between the source beam wavelength and the common reference wavelength, wherein the wavelength deviation detector is configured to detect a threshold amount of wavelength deviation that is indicative that the single-wavelength laser source is problematic or a single-wavelength laser source of a separate transceiver coupled to send the one or more receive beams is problematic, wherein each transceiver is configured to indicate the wavelength deviation or problematic characteristic in order to identify problematic laser sources and thereby prevent the linked network of transceivers from communicating at a linked network wavelength that is marginal or out-of-range in relation to the common reference wavelength.

23 Claims, 9 Drawing Sheets

(56) References Cited

U.S. PATENT DOCUMENTS

| | | | | | |
|---|---|---|---|---|---|
| 6,262,822 | B1* | 7/2001 | Obhi | ............... | H04J 14/02 |
| | | | | | 398/9 |
| 6,567,198 | B1* | 5/2003 | Kang | ............... | H04B 10/506 |
| | | | | | 398/91 |
| 7,636,522 | B2* | 12/2009 | Nagarajan | ............... | H04B 10/506 |
| | | | | | 398/79 |
| 7,756,417 | B2* | 7/2010 | Takeuchi | ............... | H04J 14/025 |
| | | | | | 398/33 |
| 8,594,514 | B2* | 11/2013 | Rahn | ............... | H04B 10/0779 |
| | | | | | 398/195 |
| 8,634,680 | B2* | 1/2014 | Oku | ............... | G02B 6/29352 |
| | | | | | 356/477 |
| 8,983,306 | B2* | 3/2015 | Bernasconi | ............... | H04B 10/07 |
| | | | | | 398/201 |
| 9,071,364 | B1* | 6/2015 | Voois | ............... | H04B 10/58 |
| 9,312,980 | B1* | 4/2016 | Kakande | ............... | H04B 10/40 |
| 10,231,038 | B2* | 3/2019 | Rickman | ............... | G02F 1/2257 |
| 10,341,022 | B2* | 7/2019 | Zhang | ............... | H04B 10/2543 |
| 10,972,184 | B2* | 4/2021 | Olson | ............... | H04B 10/541 |
| 11,233,371 | B2* | 1/2022 | Popovic | ............... | H01S 3/08086 |
| 11,245,472 | B1* | 2/2022 | Jia | ............... | H04B 10/25 |
| 2002/0136249 | A1* | 9/2002 | Akashi | ............... | H01S 5/0687 |
| | | | | | 372/38.01 |
| 2022/0019038 | A1* | 1/2022 | Heanue | ............... | G02B 6/43 |

OTHER PUBLICATIONS

Wikipedia, Photonic integrated circuit, 2020 (Year: 2020).*

* cited by examiner

LASER-SHARED COHERENT TRANSCEIVERS AND METHODS

BACKGROUND

With the increase of the required bandwidth for short reach datacenter links, there is a demand for improved communication devices that might allow such bandwidth increases. Direct detection techniques present bandwidth limitations. Although higher data rates for limited bandwidth are obtainable using coherent optical technology, that technology is not yet practical for many use cases, such as inside datacenters. For example, coherent optical transceivers often have a higher attendant cost as compared to legacy fixed-wavelength networks. Thus, a need remains for improved coherent optical modules and related techniques of operation.

DETAILED DESCRIPTION

Disclosed coherent optical transceivers and related techniques can be used to improve performance and reduce operational costs of short-reach optical communications networks such as in datacenters. Various disclosed optical transceivers are configured to enable using low-cost narrow-tunable lasers and laser sharing, and also synchronization of lasers in coherent optical links in a network of interconnected transceivers. Furthermore, disclosed techniques include detection of an out-of-tolerance variation in the operating wavelength of the laser (or lasers) in any of the modules and provides approaches for mitigating the adverse effect of that faulty component on the network performance.

Traditionally, short-reach communication inside datacenters has been based on intensity modulation and direct detection (IMDD) as it has provided cost and power consumption advantages over coherent communications. However, by the increase in the required bandwidth inside data centers and advances in development of lower-power DSPs for coherent communications, non-amplified links based on coherent transceivers are closing the gap and even beating IMDD solutions in terms of cost and power consumption, specifically as the reach of the direct-detect solutions at higher data-rate is being more limited by the dispersion and link budget requirements. The higher sensitivity of coherent-transceivers also provides a more appealing link budget, enabling cost-saving solutions such as source laser sharing between different co-integrated coherent-transceivers. To enable such approaches, challenging requirements on coherent detection and synchronization/frequency-locking between the transmitter laser and local oscillator (LO) of the coherent receiver need to be addressed.

In a coherent module, multiple coherent transceiver channels are integrated in a single pluggable module to share a single laser for both transmitting and receiving (e.g., using a local oscillator). Each transceiver may have multiple channels ("multi-channel") and be connected to a different coherent optical module through a break-out configuration, resulting in a network of interconnected optical modules through breakout interconnects. For the coherent link to function correctly or optimally between these modules, all lasers in the modules should be locked to the same wavelength so that the transmit and local oscillator laser frequency difference for all links remains in a small tolerance window of coherent links. One way to insure this is to make sure that all laser wavelengths are locked to accurate wavelength references in the optical modules.

As discussed above, with the increase of the required bandwidth for short reach data center links, coherent optical transceivers, if designed properly, can provide a more economical solution compared to traditional optical intensity modulation and direct detection (IMDD) transceivers. Herein, "short reach" generally refers to intra datacenter or intra-campus links, which is usually considered to be a maximum reach of 500 m to 2 km in the current industry. To remain low-cost and tailored for shorter reach point-to-point applications, coherent optical transceivers should use low-cost single wavelength continuous wave (CW) lasers (e.g., DFB lasers) instead of more expensive wavelength-tunable lasers offered in many existing coherent optical transceiver communication systems. The signal detection in systems using coherent optical transceivers is based on mixing the received signal with a local oscillator laser and a coherent receiver that extracts both amplitude and phase of the modulated signal on the laser light. Therefore, either a separate laser in addition to transmitter (Tx) laser is used as a local oscillator, or a portion of the Tx laser is coupled into the receiver and used to mix with the incoming light from the module on the other side of the link. To maintain a lower cost, typically a single laser will be used as a local oscillator for both the transmit and receive functions. In order for such a coherent link to work properly, the laser or lasers in each of the modules on both sides of the link should emit laser light at wavelengths (frequencies) that are sufficiently close together such that any small difference falls within a detuning tolerance of the coherent receiver digital signal processor (DSP). The DSP tolerance for the wavelength detuning depends on modulation format and baud-rate, but it usually falls in deep sub-nm range (e.g., in the order of 3-5 GHZ. 25 pm-40 pm or for 60 Gbaud 16 QAM at 1550 nm, or at most in the order of 10-20 GHz or 0.06-0.11 nm at 1310 nm wavelength and 0.08-0.16 nm at 1550 nm). Such tolerances are generally difficult to achieve without some sort of wavelength control.

Depending on the application, the wavelength of the laser at the transmitter could be tuned or locked to a fixed reference using temperature control or other frequency locking mechanism. However, the laser wavelength undergoes drift and variation as the laser ages over its lifetime. Also, controlling the exact wavelength range over production and corner cases could be challenging. Therefore, without an appropriate mechanism for laser wavelength measurement and correction, it becomes difficult to maintain the laser wavelength generated by a particular coherent transceiver so that it stays within the system tolerance. Thus, with coherent-based optical transceivers, a new failure mode associated with the wavelength drift/variation exists in addition to laser output power. To compound this, it will not be clear which side of a link is the source of a wavelength drift failure on a particular link, because without additional measurements there is no mechanism to measure which side may be deviating from the initial set wavelength.

While in many point-to-point (native mode) applications, this issue has smaller blast radius as the laser on the Rx side has to follow the known Tx laser on the other side, this may not be achieved in a breakout configuration, where multiple different lasers may be involved. Such a solution also is less desirable because the wavelength could depart from a suitable operating range. Breakout configuration examples discussed further below include breakout between a 1.6 Tbps module to four 400 Gbps module ("breakout mode I") and breakout between a 1.6 Tbps module to four 1.6 Tbps modules ("breakout mode II") while only one breakout link of 400 Gbps on each module is used.

While DSPs in a coherent optical transceiver module can typically measure and tolerate a small frequency detuning, or offset, between a Rx signal and local laser wavelengths, such DSPs typically cannot measure the absolute laser frequency and wavelength. As a result, a frequency deviation of a laser of a coherent optical transceiver module could initialize and establish an operating frequency of the network that is close to detuning limits of one or more other coherent modules on the network. Furthermore, additional variation of voltage and temperature that occurs after the initial link up and during operation of the module can increase the likelihood of the wavelength drifting to an out of tolerance value, thereby increasing likelihood of failure and lending additional significance to the initialized frequency of the module.

Such laser frequency deviation of a module could cause various problematic scenarios. For example, in one set of situations, the deviated frequency could cause the link of a particular module to operate at an edge of the frequency in a point-to-point native mode and, thus, with degraded the link performance, such as reduced error margin, increased chance for link flap, reduced tolerance to temperature variation, etc. Furthermore, from the perspective of the module it will not be clear which side of the link is the source of the problem frequency deviation and makes the failure analysis in the field more difficult. In a second set of situations, a frequency deviation of a selected module could cause several modules to tune and work at the edge of frequency in the breakout applications and degrade the performance of several links. For example, a digital signal processor (DSP) of a module can adjust an operating wavelength of the internal single-wavelength laser source to reduce or eliminate a wavelength gap between the Tx and Rx signal over a small range of wavelength, i.e., over a range that the DSP can tolerate. However, the DSP is generally not aware of the absolute frequency it detects. Thus, if the Rx frequency becomes a marginal or slightly out-of-range for optimal network operation, the module may adjust to that, or if the Tx frequency becomes marginal or slightly out-of-range (e.g., due to an incorrect locking to an internal reference wavelength), the module may cause other modules that receive its Tx to adjust to that. Similar to the first set, it is not clear which module is the source with the frequency deviation that disrupts network communication causing other modules to operate at an out of tolerance frequency. This will be a very difficult and time-consuming failure analysis of the live network. In a third set of situations, modules on two sides of a link could be at different locations and consequently experience different variations in operating conditions. This could cause intermittent operational issues, which would be very difficult to reproduce and debug, and it will not be clear which module is the source causing the frequency difference to increase or decrease during operation.

Figure 1:
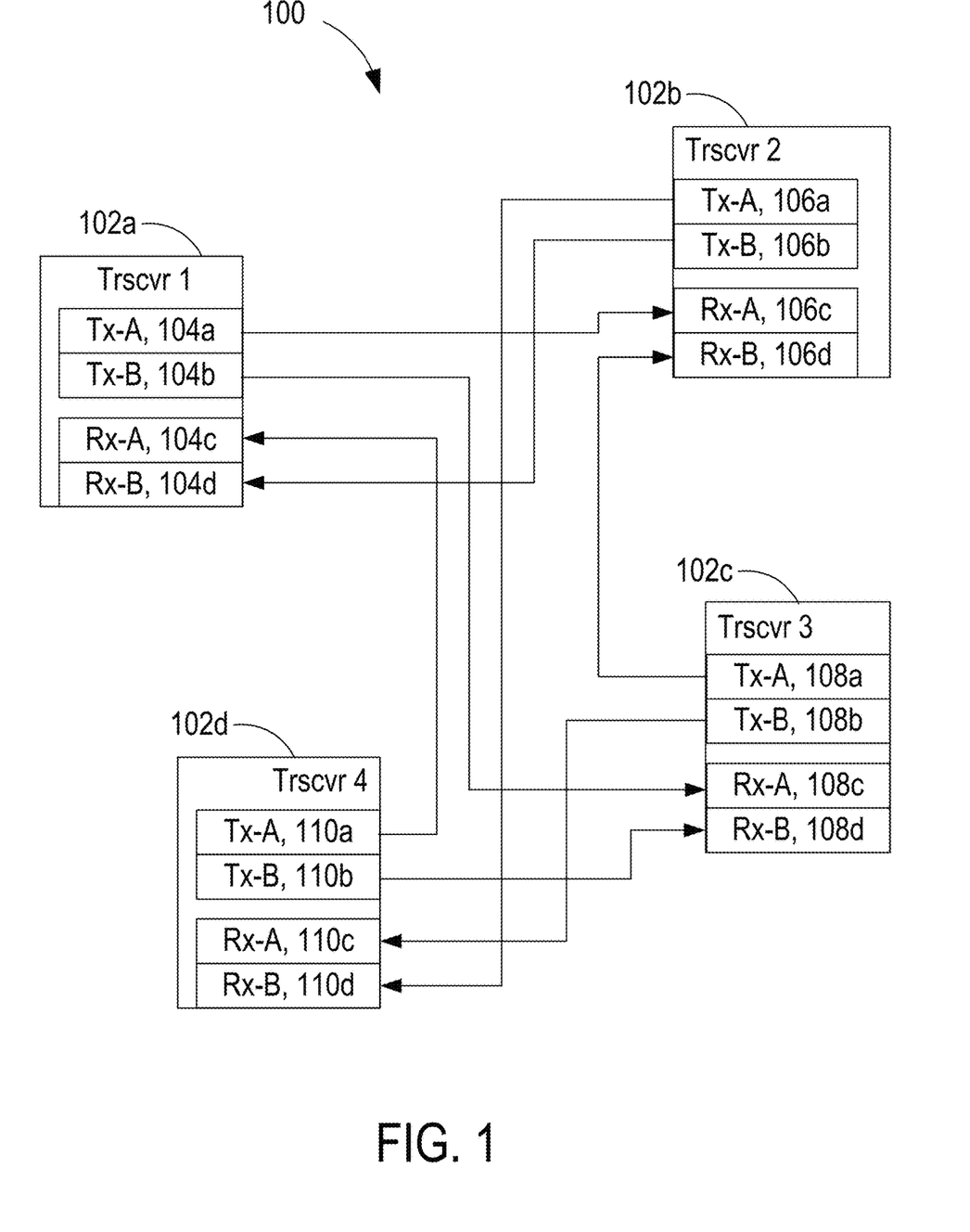
FIG. 1 is a schematic of a network of coherent optical modules.

FIG. 1 is an optical communication network 100 of a plurality of coherent optical modules 102a-1102d. The transceivers 102a-102d include respective sets of transmit and receive channels 104a-104d, 106a-106d, 108a-108d, 110a-110d which can be coupled among different transceivers in a breakout configuration. For simplicity, each transceiver is shown to respectively include two transmit channels and two receive channels, but it will be appreciated that in various transceiver examples and network examples, different numbers of channels can be provided for modules, transmit and receive need not be equal within a module, and different modules of a network can have different numbers of channels. In many examples, four or more transmit channels and four or more receive channels is typical. Each transceiver typically includes a single-wavelength laser source that is shared among each of the transmit and receive channels of the module. Different transmit channels of a module can be coupled to different modules and different receive channels of the module can receive signals from different modules. Thus, the interconnected modules are configured to operate at a common wavelength so that coherent communications can occur. When a module's wavelength significantly deviates from the common wavelength, a communication deterioration or failure can occur. In disclosed examples, modules can be configured to identify out-of-range or marginal operational wavelengths to reduce or avoid problematic operation. In some examples, a wavelength deviation detector is added to detect out-of-range or marginal wavelengths of operation. Herein, a wavelength deviation typically refers to a deviation from a target wavelength or reference wavelength, and in various examples detection of a wavelength deviation can correspond to detection that a deviation has occurred or exists, detection of a signed deviation, and/or detection of an amount of deviation. In further examples, a digital signal processor used to analyze and compare and inbound receive signal with a local oscillator beam is used to detect a wavelength deviation. In additional examples, both an additional wavelength deviation detector and a DSP are used to detect wavelength deviations. In some examples, a DSP is used to adjust the wavelength of operation of the local laser source.

Figure 2:
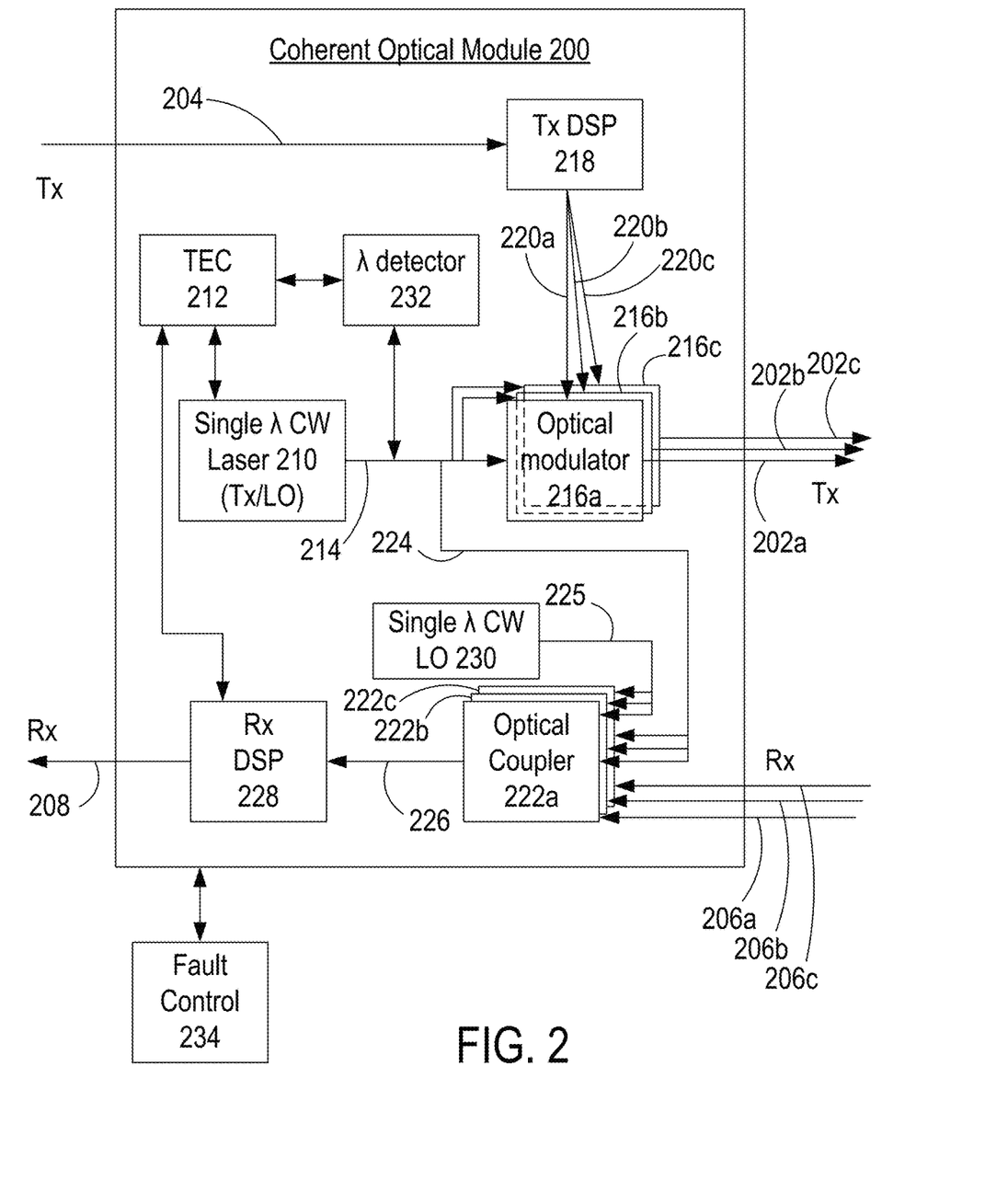
FIG. 2 is a schematic of an example coherent optical module with wavelength deviation detection of locally generated laser light.

FIG. 2 is an example coherent optical module 200 configured to transmit one or more optical transmit signals 202a-202c (coupled into respective optical fibers or lines) based on outbound electrical signal data 204, and to receive and convert an optical receive signal 206 into inbound electrical signal data 208. The module 200 includes a single-wavelength continuous-wave laser source 210, such as a laser diode. Various single-wavelength laser examples include surface emitting lasers, Fabry-Perot lasers, distributed Bragg reflector lasers, but more typically distributed feedback lasers. In many examples, the laser source 210 is relatively inexpensive and may therefore not include complex active wavelength-locking mechanisms. For example, the laser source 210 is typically temperature controlled with a thermal control system, such as a thermoelectric cooler (TEC) 212, and in many examples this temperature control can provide an inexpensive wavelength locking approach of the laser source 210. For example, an MCU, DSP, or other processing component of the module 200 can include a look-up table that correlates detected temperature values with operational wavelength values, and locking to a reference wavelength can be obtained through feedback control around a temperature process variable, which can be associated with the reference wavelength. Calibrated temperature-wavelength associations are typically provided at manufacture. Reference wavelengths can be programmed in the module 200 as a default, e.g., during calibration, or can be updated individually or dynamically during operation, such as through a centralized control hub (such as fault controller 234 described below) or from other modules.

The laser source 210 produces a beam 214 that is coupled to one or more optical modulators 216a-216c. The outbound electrical data signal 204 is received by a transmit digital signal processor 218 and converted to optical modulator signals 220a-220c for the optical modulators 216a-216c (e.g., with one or more processors and one or more digital to analog converters). The transmit digital signal processor 218 can be configured to produce various modulation types for coherent encoding of the transmit signals 202a-202c, such as amplitude shift keying, phase shift keying, quadrature amplitude modulation, etc. The optical modulators 216a-216c produces the optical transmit signals 202a-202c that are sent out from the coherent optical modulator 200 that can be directed to other coherent optical module nodes in a point-to-point or extended breakout network. The optical modulators 216a-216c can be of various types, such as electro-optic modulators including Mach-Zehnder type modulators. Each grouping, e.g., signal 220a, modulator 216a, transmit signal 202a, can be referred to as a transmit channel and while three are shown, other modules can include different quantities of transmit channels, e.g., 1, 2, 4, 8, 16, etc. In some examples, the optical modulators 216a-216c can be integrated as part of a common photonic integrated circuit or chip. In many examples, the modulators 216a-216c can have a common design and transmit channels can be paired or grouped with receive channels (discussed below). In many examples, the module 200 includes only a single DSP 218 but in further examples, multiple DSPs may be provided.

An optical coupler 222 is situated to receive the optical receive signals 206a-206c and to combine the optical receive signals 206a-206c with a local oscillator beam 224, such as a portion of the beam 214 produced by the laser source 210, to produce a mixed beam 226 (e.g., introducing various phase shifts). The mixed beam 226 is coupled to a receive digital signal processor 228 (e.g., through one or more photodetectors and analog-to-digital converters) that is configured to convert the signal data encoded in the mixed beam 226 into the inbound electrical data signal 208. The optical coupler 222 can be a multi-port coupler such as an optical hybrid. The optical coupler 222 can be or form part of an integrated coherent receiver (ICR). The receive digital signal processor 228 can be part of the same unit as the transmit digital signal processor or can be a different unit. The local oscillator beam 224 can be generated by the laser source 210 or with another single-wavelength continuous-wave laser source 230, such as LO beam 225. Examples of the module 200 can include small form-factor pluggable coherent optical transceivers.

In some examples, the module 200 can further include a wavelength detector 232 coupled to the single beam 214. The wavelength detector 232 can be configured to detect a deviation of the wavelength of the beam 214 relative to the reference wavelength. In some examples, the laser source 210 can be part of a photonic integrated circuit (PIC) of the module 200 and the wavelength detector 232 can be integrated into the PIC to detect the wavelength deviation of the laser beam 214. In generalized applications, frequency measurements of light are often performed over a large range and can be increasingly difficult in view of temperature variations. In view of the narrow dynamic range needed for the single, fixed wavelength of interest to be detected, the complexity and footprint of the wavelength detector 232 can be reduced to maintain a low cost for practical inclusion in low-cost pluggable coherent optical modules. Further, while active wavelength-locking techniques may be available, they also can significantly add expense to the process of wavelength detection. In many examples, the wavelength detector 232 is configured to accurately detect the deviation of the wavelength, with a high measurement stability over the PIC lifetime, to eliminate the need for any recalibration during the lifetime of the laser 210. In some examples of the wavelength detector 232, a small portion of the laser power (e.g., <2% tap) of the beam 214 could be redirected and coupled to the wavelength detector 232. In some examples, the wavelength detector 232 is a fixed frequency filter configured to pass or block light in relation to the allowable operational range of the laser source 210 for the coherent optical module. Further examples of the wavelength detector 232 can include tuned micro-ring resonators and are discussed further below. In some examples, the module 200 can be in communication with a centralized fault controller 234 that can be configured to receive information relating to the wavelength deviation detection of the module 200. In some examples, the fault controller 234 can send information to the module 200 from one or more other coherent optical modules in optical communication with the module 200 to relay optical fault information. For example, the module 200 can receive an indication that the wavelength of one or more of the optical transmit signals 202a-202c produced by the module 200 are marginal or out-of-range in relation to a reference wavelength of operation for the network of modules. In further examples, module fault information can be communicated directly to other modules of the network of modules.

In some examples, the TEC 212 can be coupled to the receive DSP 228 to assist with providing feedback control over the wavelength of the laser source 210. For example, the DSP 228 can be configured to detect a deviation between the wavelength of the optical receive signal 206a and the wavelength of the laser beam 214, either an absolute value of the deviation without an indication that the difference is positive or negative or a signed absolute value of the deviation. For absolute value deviations, a sign can be determined by adjusting a temperature in the direction of a guessed direction and confirming or using the opposite sign based on the change in the deviation in response to the adjusted temperature. In some examples, the wavelength detector 232 can correspond to the receive DSP 228 instead or in addition to a detection element coupled to the laser beam 214.

In some examples, various actions can be taken in response to a deviation detected by the DSP 228 but without using the detected deviation to adjust a local laser wavelength. For example, in some of such scenarios, each laser wavelength of a network of multiple modules can remain unchanged during a link-up process. Wavelength measurements performed at the different modules then could be used to directly indicate the marginal or out-of-range wavelength for any connected module. For example, in the case that a wavelength measurement is performed on a transmit side (e.g., with the wavelength detector 232) and an out-of-range or marginal laser wavelength is detected, an alarm or other indication can be provided that the laser on the transmit side is exhibiting problematic operation. The wavelength measurement can be performed with respect to a targeted reference wavelength of operation, such as a common wavelength of operation assigned to each module on the network. Similarly, where the wavelength measurement is performed at a receive side (e.g., through a wavelength detector coupled to the receive beam) and an out-of-range or marginal laser wavelength is detected, an alarm or other indication can be provided that the laser on the other side of the link (which is known from the network topology) is the source of the problematic operation. Such examples can be independent of different network topologies (such as native or breakout modes as discussed further herein).

In further examples, in response to a wavelength difference detected by the DSP 228, the DSP 228 can cause the TEC 212 to adjust the local temperature so that the operating wavelength of the beam 214 also adjusts. For example, a wavelength difference between a received signal and a local oscillator can be used to adjust local laser wavelength, e.g., by shifting the reference wavelength. In some networks using such modules, e.g., two, one module will come to define a reference wavelength that the other one will follow. When the modules become locked to an out-of-range (or marginal wavelength), using the wavelength measurement information provided by the DSP 228 in an isolated way will typically not assist in determining the source of the problematic wavelength, regardless of whether the wavelength measurement is performed at a transmit side or a receive side of a module. Additional information can be obtained from the compensation signal provided by the DSP 228 to shift the wavelength of operation of the module from its nominal operation. For example, where the wavelength measurement is performed at the transmit side of the module (e.g., with wavelength detector 232), it is possible that the wavelength measurement could indicate an out-of-range condition for the locally generated laser wavelength. Associated with the wavelength measurement, a compensation signal can be applied by the DSP to adjust the wavelength of the local oscillator and the compensation signal could be relatively small. Such a difference relative to other modules can indicate that the laser source of the module is operating out of tolerance. Similarly, a wavelength measurement can be performed at a receive side of the module, and an out-of-range wavelength measurement together with a small compensation signal applied to adjust the wavelength of the local oscillator can be associated with a locally generated laser wavelength that is operating out of tolerance. In response to a determination that there is a sufficient divergence between compensation signals and wavelength measurements to indicate an error, modules can be disabled and/or flagged for maintenance or replacement. In some examples, an out-of-tolerance wavelength measurement (transmit or receive) can be used to cause a transceiver to disable wavelength adjustment based on the wavelength difference detected by the DSP 228.

In some instances, a wavelength measurement can be obtained at a transmit side of a module that can indicate an out-of-range wavelength on the module before the module is in coupled communication with another module. In particular, the wavelength deviation could occur over time, such as due to aging or operational condition. However, when a module is linked up and begins sending and receiving data, the operating condition can change relative to the operating condition without linked communication and, thus, the laser wavelength could change. Therefore, in many examples, a standalone wavelength measurement on the transmit side of a module that is powered up but not connected or linked up with another module is not performed or the corresponding measurements are not relied upon to provide a useful indication of an out of tolerance laser.

In further module and network examples that normally operate by adjusting a local wavelength based on detected wavelength differences (e.g., from a DSP or other wavelength detector), the adjustment control over wavelength can be selectively suspended. Then, the modules of the network can determine out-of-range or marginal laser operation for each module by wavelength measurements performed at the different modules, e.g., similar to how examples described above use wavelength measurement to determine module faults without using the detected deviation to adjust a local laser wavelength. In such examples, where it is determined that an out-of-range wavelength exists, corrective actions can be taken or alarms raised similar to those described above for examples in which the detected deviation by the DSP is not used to adjust a local laser wavelength. Again, provided there is knowledge of the network topology, module faults can be determined with wavelength measurements performed on either the transmit side or receive side.

Figure 3:
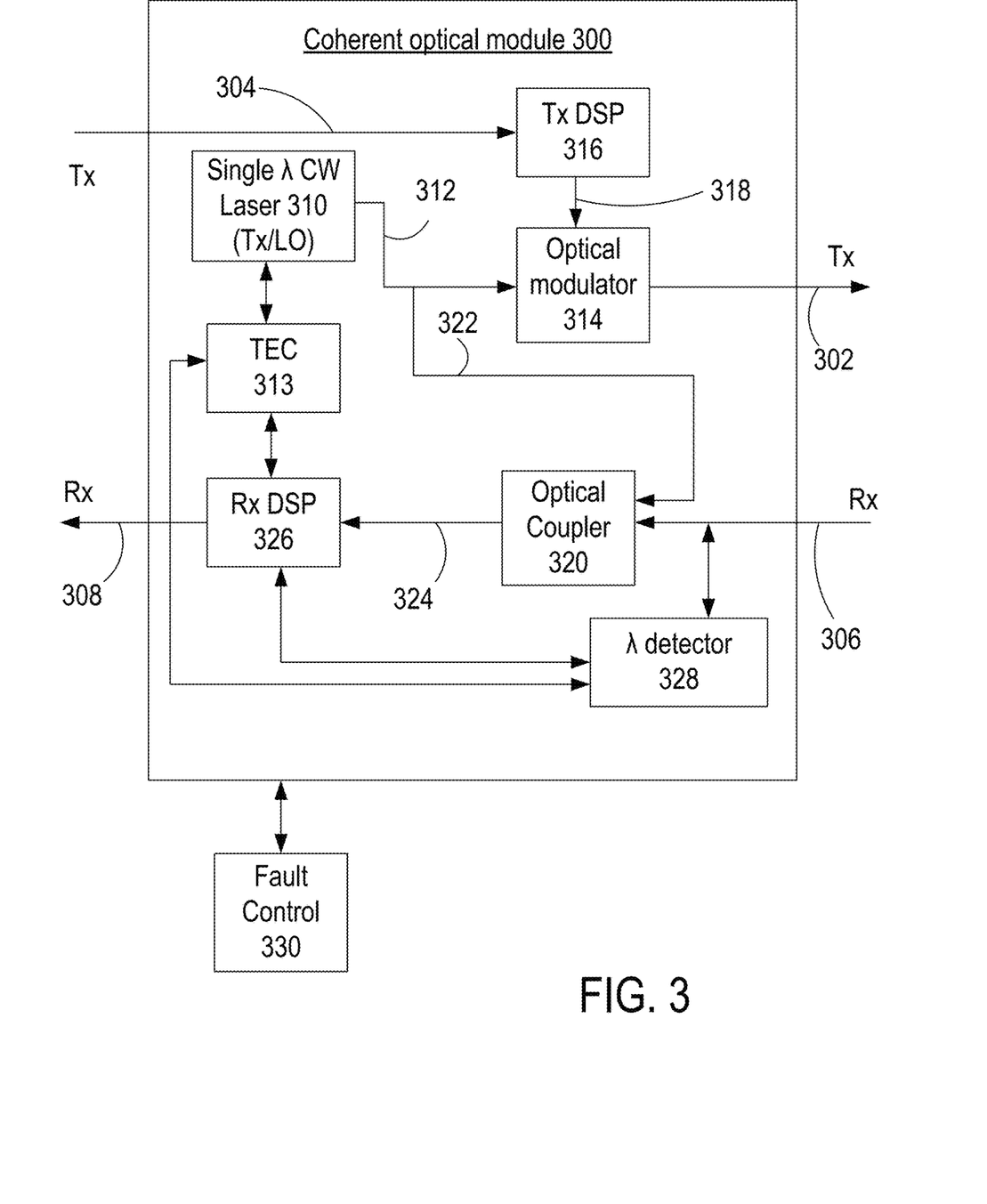
FIG. 3 is a schematic of another example coherent optical module with wavelength deviation detection of an optical receive signal.

FIG. 3 is a coherent optical module 300 that can be similar in various respects to the module 200, such as additional transmit and receive channels and associated componentry, though fewer components are shown in FIG. 3 for clarity of illustration. The module 300 is configured to transmit an optical transmit signal 302 based on an outbound electrical data signal 304, and to receive and convert an optical receive signal 306 into an inbound electrical data signal 308. The module 300 includes at least one single-wavelength continuous-wave laser source 310, such as a laser diode. The laser source 310 produces a beam 312 that is coupled to an optical modulator 314. The laser source is coupled to a TEC 313 that is configured to maintain the temperature of the laser source 310 at a temperature corresponding to a selected reference wavelength of operation for the beam 312. The reference wavelength is typically a common wavelength shared among other coherent optical modules coupled to the module 300 to form an optical communications network. The outbound electrical data signal 304 is received by a transmit digital signal processor 316 and converted to an optical modulator signal 318 for the optical modulator 314 (e.g., with one or more processors and one or more digital to analog converters). The optical modulator 314 produces the optical transmit signal 302 that is sent out from the coherent optical modulator 300 that can be directed to other coherent optical module nodes in a point-to-point or extended breakout network. An optical coupler 320 is situated to receive the optical receive signal 306 and to combine the optical receive signal 306 with a local oscillator beam 322, such as a portion of the beam 312 produced by the laser source 310, to produce a mixed beam 324. The mixed beam 324 is converted into an electrical data signal that is coupled to a receive digital signal processor 326 that is configured to convert the data encoded in the mixed beam 324 into the inbound electrical data signal 308. The local oscillator beam 322 can be generated with another single-wavelength continuous-wave laser source that is part of the module 300 but it is preferably generated by the laser source 310 to lower cost and reduce complexity.

The module 300 can further include a wavelength deviation detector 328 coupled to the optical receive signal 306 to detect a deviation in the wavelength of the optical receive signal 306 and the reference wavelength or wavelength of the local oscillator beam 322 (which can be the same wavelength as the beam 312). From the detected wavelength, the module 300 can be configured to determine an out-of-range or marginal condition, similar to how out-of-range or marginal wavelength deviations can be found for the module 200. For example, in view of the relative stability of the propagating wavelength from another module to the module 300, the wavelength deviation can indicate whether the wavelength of the other module sending the optical receive signal 306 is out-of-range or marginal and therefore problematic. A wavelength deviation can be reported to a fault controller 330, which can be centralized in some examples, so that an alarm can be raised, or other corrective action taken. For example, the fault controller 330 can include a higher-level wavelength monitoring program that collects wavelength deviation or related data from all coherent optical modules coupled to form a network operating on a shared wavelength. The fault controller 330 can be configured to suppress a faulty module once identified. In some examples, the wavelength deviation can be reported to the module sending the optical receive signal 306 and corrective action can be taken based on a distributed network of fault communication among the module 300 and other modules coupled to form the coherent optical communication network.

Figure 4:
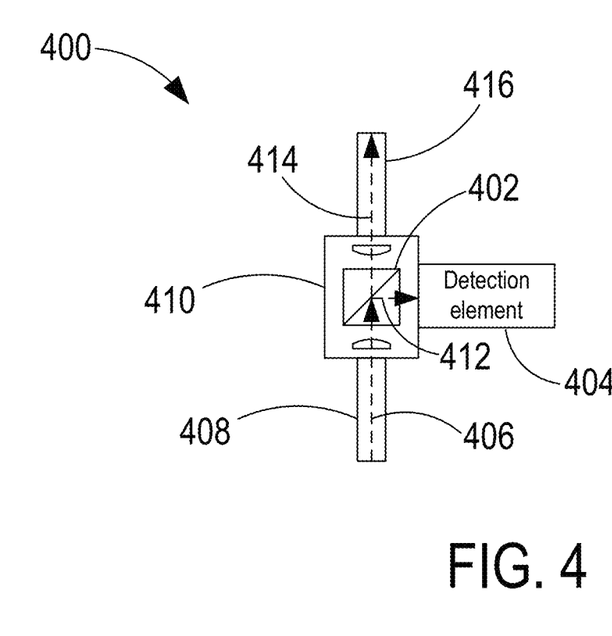
FIG. 4 is a side cross-sectional schematic of a wavelength detector for a coherent optical module.

FIG. 4 is an example wavelength detector 400 that can be used in various coherent modules to detect changes in operational wavelength of a single-wavelength continuous-wave laser sources, such as any of those described herein. In some examples, the wavelength detector 400 can include a beam splitter 402 and a small detection element 404, such as a photodiode. The detection element 404 can be configured to be wavelength sensitive, e.g., with a narrow band (e.g., pass or stop) optical filter centered on a fixed frequency of interest. An input beam 406 that is to be transmitted or that is received can be coupled through an input waveguide 408 (such as an optical fiber or PIC waveguide) into an optical arrangement 410 that includes the beam splitter 402. The beam splitter is configured to direct a portion 412 (e.g., 1%, 2%, 5%, etc.) of the beam 406 to the detection element 404 for measurement of the wavelength of the beam 406. A remainder beam 414 is coupled from the optical arrangement 410 into another waveguide 416 for subsequent modulation or demodulation. The optical arrangement 410 can include free-space propagation or remain all-fiber or photonic components.

The wavelength detections provided by examples of the transceivers 200, 300 can be used in various ways to provide corrective actions, such as to disable a problematic transceiver, flag the problematic transceiver for replacement, or adjust transceiver operation into a following mode so that the problematic transceiver can be prevented from defining a reference wavelength of operation for an interconnected network of short-reach transceivers. In some examples, the wavelength detections can be used to monitor the deviation of the laser from the intended wavelength and provide a suitable warning signal to a network operator.

Figure 5:
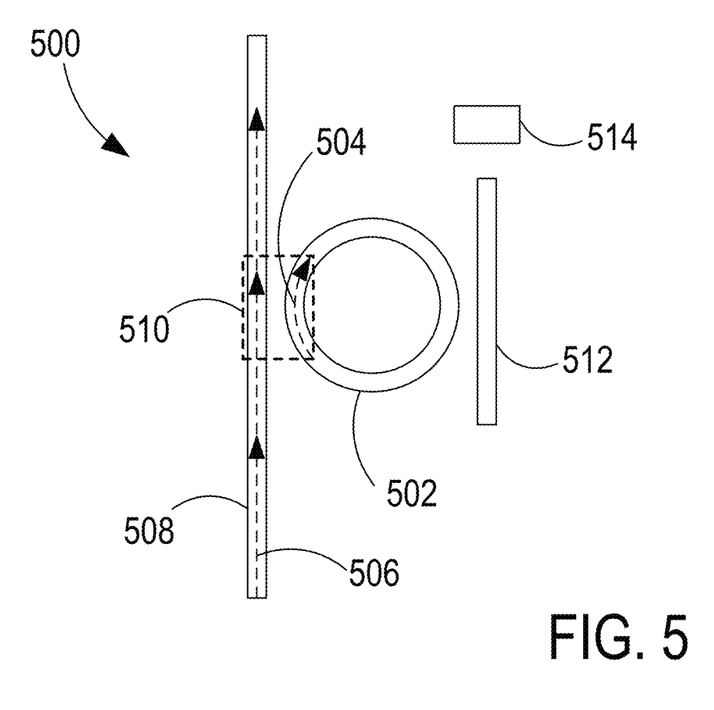
FIG. 5 is a top view of a wavelength detector for a coherent optical module, including an evanescently coupled detection resonator.

FIG. 5 is another example of a wavelength detector 500 that can be used in various coherent modules to detect changes in operational wavelength of a single-wavelength continuous-wave laser sources, such as any of those described herein. The wavelength detector 500, can include a thermally tuned resonator 502, such as a micro-ring resonator, with a narrow linewidth (e.g., tens of GHz). The resonator 502 can be coupled to receive a portion 504 of a beam 506 that is to be transmitted or that is received by a coherent optical module. The beam 506 can propagate through an adjacent waveguide 508 that can be coupled to the resonator 502. e.g., through an evanescent field coupling region 510. The resonator 502 can be coupled to an input waveguide 512 (also through an evanescent coupling, by way of example) and can direct the detected light to a small integrated detector 514, such as a photodiode. A change in the output of the waveguide-coupled resonator (e.g., micro-ring) vs. the control signal and local PIC temperature measurements can be used to estimate the laser wavelength. For example, the control signal for a TEC can be based on a total power of the optical signal. Thus, rather than measuring wavelength directly, a deviation of the wavelength from a reference value can be determined through an optical power measurement. In some examples, an integrated heater can be coupled to the wavelength detector micro-ring resonator to keep the resonator temperature at a fixed temperature where its resonance wavelength is matched with the target laser wavelength of the beam 506. The 502 can operate as a narrow frequency filter that only passes optical power then the wavelength matches a narrow passband range of the resonator. When the laser frequency of the beam 506 is matching the resonant frequency of the micro-ring resonator, a detected output power can be at or close to maximum to indicate that the laser frequency is not significantly deviating from the reference wavelength of operation for the module or network. As the laser frequency of the beam 506 drifts, the detected optical power decreases to eventually indicate an out-of-range or marginal operating condition. For example, when the wavelength or the frequency of the laser beam 506 deviates from the target reference wavelength, the photodetector output will increase and go above a threshold to indicate the problem of out of tolerance laser frequency drift.

Figure 6:
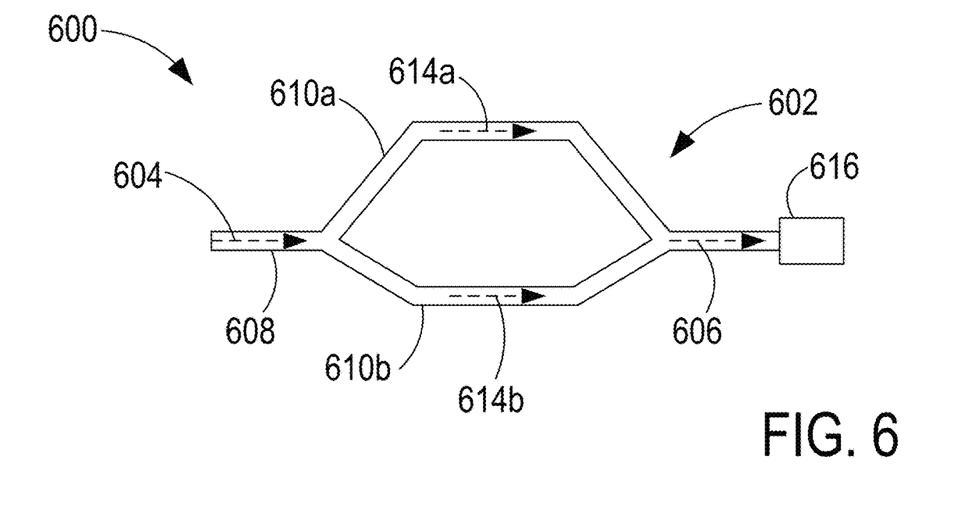
FIG. 6 is a side view of a wavelength detector that includes an asymmetric Mach-Zehnder interferometer.

FIG. 6 shows another example of a wavelength detector 600 that can be used in various coherent modules to detect changes in operational wavelength of a single-wavelength continuous-wave laser sources, such as any of those described herein. The wavelength detector 600 includes an asymmetric Mach-Zehnder interferometer (MZI) 602 situated to receive at least a portion of a beam 604 that is to be transmitted or that is received by a coherent optical module (such as beams or beam portions as described in any other examples herein). The beam 604 is directed through the MZI 602 to produce a wavelength dependent output beam 606. Example MZIs typically include an input waveguide 608, two MZ arms 610a, 610b and an output waveguide 612 that receives and recombines optical branch signals 614a, 614b from the MZ arms 610a, 610b to produce the wavelength dependent output beam 606. The output beam 606 is subsequently detected by an optical detector 616 to produce a wavelength dependent output signal. The MZI 602 can be configured in various ways to produce the wavelength dependent output beam 606. For example, different waveguide material (e.g., silicon and silicon nitride) and/or different waveguide geometry (e.g., waveguide width) may be used and/or different order modes can be coupled into different arms of MZI. By varying MZI operational parameters such as those described, the MZI 602 can be configured to operate athermally, so as to provide an input wavelength dependent signal that is independent of temperature over the operating range of wavelength, or to provide known thermal and wavelength sensitive responses, which can be used to simultaneously extract local PIC effective temperature and input laser wavelength. In general, the MZI 602 can be configured to provide high resolution over the target temperature range and improved long-term stability to avoid a drift in the wavelength-meter response and calibration errors as the coherent optical module ages.

Figure 7:
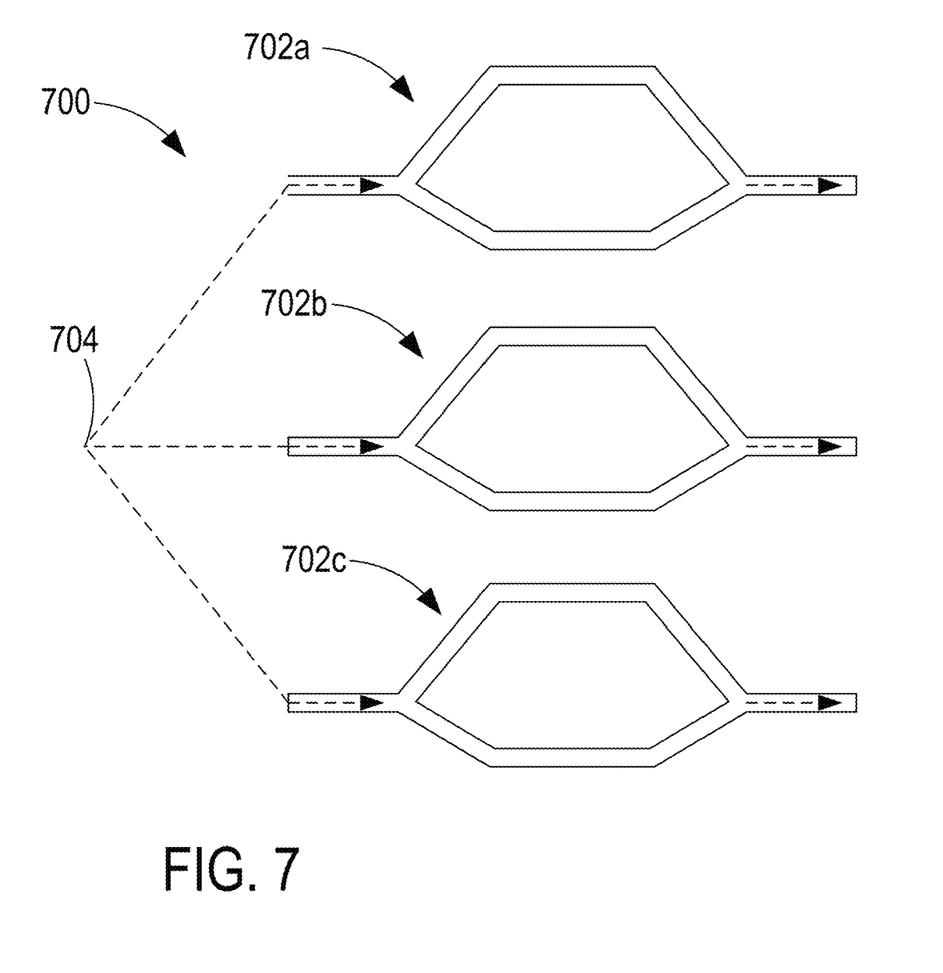
FIG. 7 is a side view of a wavelength detector that includes an array of Mach-Zehnder interferometers.

FIG. 7 is an array 700 of asymmetric MZIs 702*a*, 702*b*, 702*c* that can be used as part of a wavelength detector that can be used in various coherent modules to detect changes in operational wavelength of a single-wavelength continuous-wave laser sources. The MZIs 702*a*-702*c* can be similar to the MZI 602 but with different parameter values selected for the different array members configured to cover wavelength dependent signal detection for specific wavelength and/or temperature ranges. At least a portion of an input laser beam 704 can be coupled to the MZIs 702*a*-702*c* to produce the different wavelength dependent output beams.

There are other methods for implementing such a fixed frequency filter. In each implementation, the intend will be to have a simple output that is measurable on the device (like output current of a photodetector) to indicate whether the signal frequency is within the expected range or not. That will help identifying the failure from the frequency drift in a module and help maintaining reliable operation condition.

Figure 8:
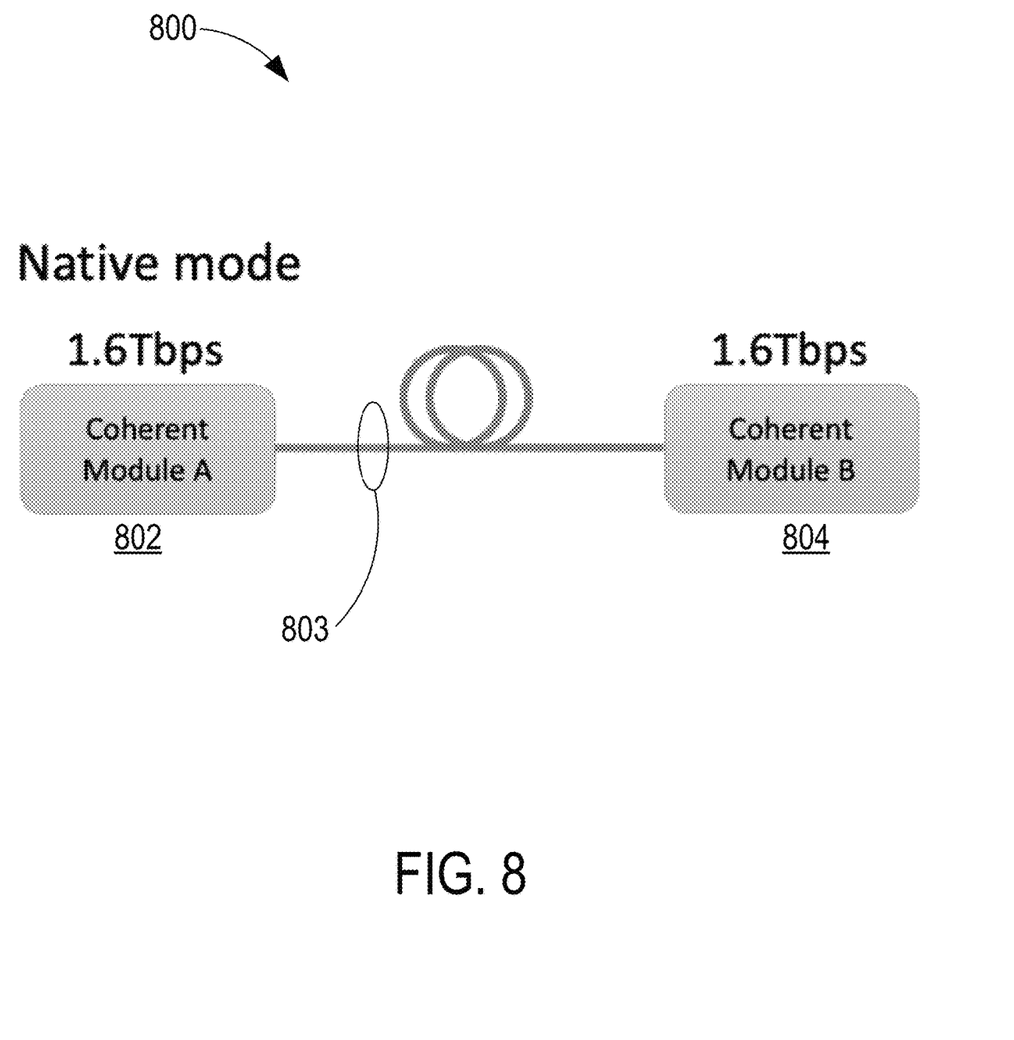
FIG. 8 is a schematic of an optical network of coherent optical modules in a native mode configuration.

FIG. 8 is an optical communication network 800 of a pair of coherent optical modules 802, 804 configured in a native mode in which the modules 802, 804 are in optical communication with each other but not other modules. In a native mode one or more optical data channels are coupled through respective fibers 803 (shown as a fiber bundle in the figure) between the pair 802, 804. Each of the modules 802, 804 can include an internal laser source that generates a laser source beam that can be used to generate one or more laser transmit beams or mixed with one or more receive beams (or both). In many examples, all of the transmit channels on each module 802, 804 share a common laser, though in further examples a module includes a plurality of internal laser sources for use with selected sets of one or more transmit channels, receive channels, or transmit and receive channels.

In some examples, one or both of the modules 802, 804 can include a wavelength detector configured to directly or indirectly detect the wavelength of light produced with the internal laser source or received along one or more receive channels received by the module from the other module. Using the wavelength detector, the modules 802, 804 can determine when a wavelength of the transmit or receive beams is operating at an edge (or outside) of an operational frequency range of the module. For example, a module can detect its transmit wavelength being out of tolerance and/or it can detect a receive wavelength being out of tolerance. From such a determination, one or both of the modules can be configured to proceed with one or more remedial responses, such as disabling operation of a selected module, flagging a module as problematic or requiring replacement, or changing operation so that a problematic module delays transmission at a startup or during module synchronization time so that the problematic module is less likely to define a wavelength to which the other module tunes or adjusts its wavelength to follow.

Figure 9:
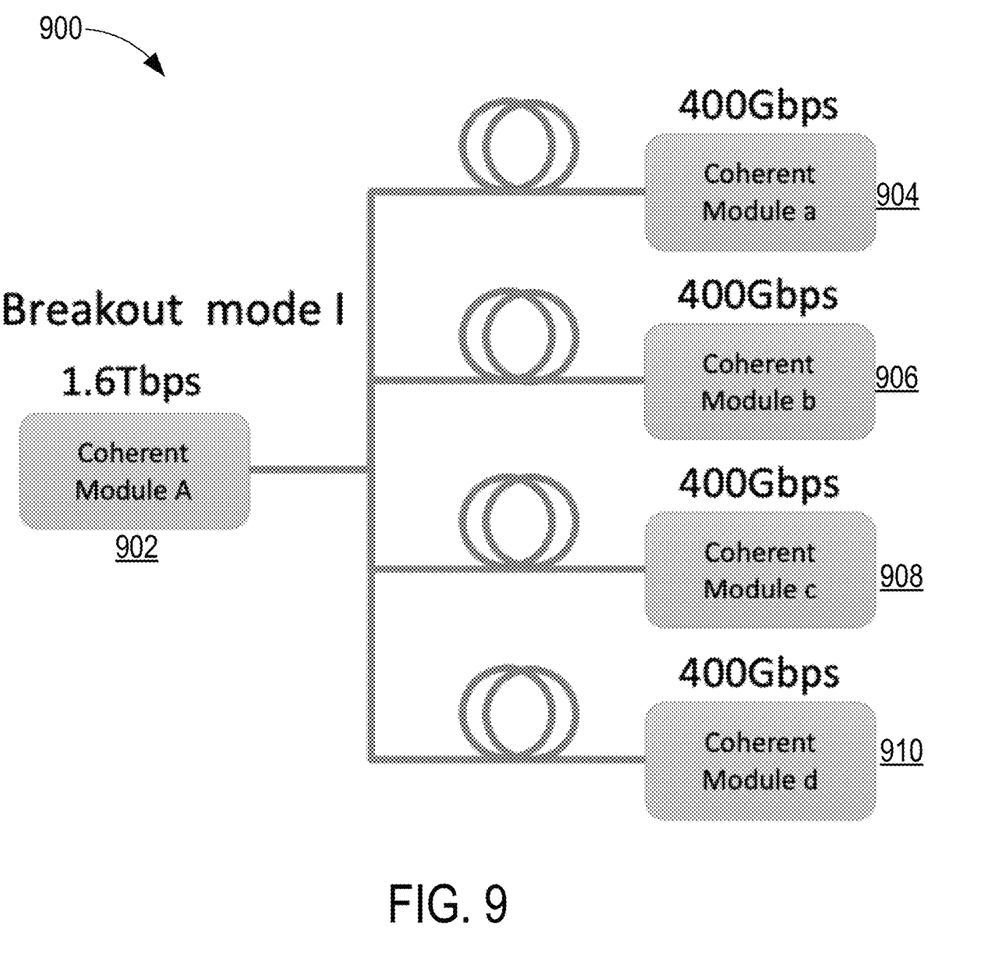
FIG. 9 is a schematic of an optical network of coherent optical modules in a first breakout mode configuration.
Figure 10:
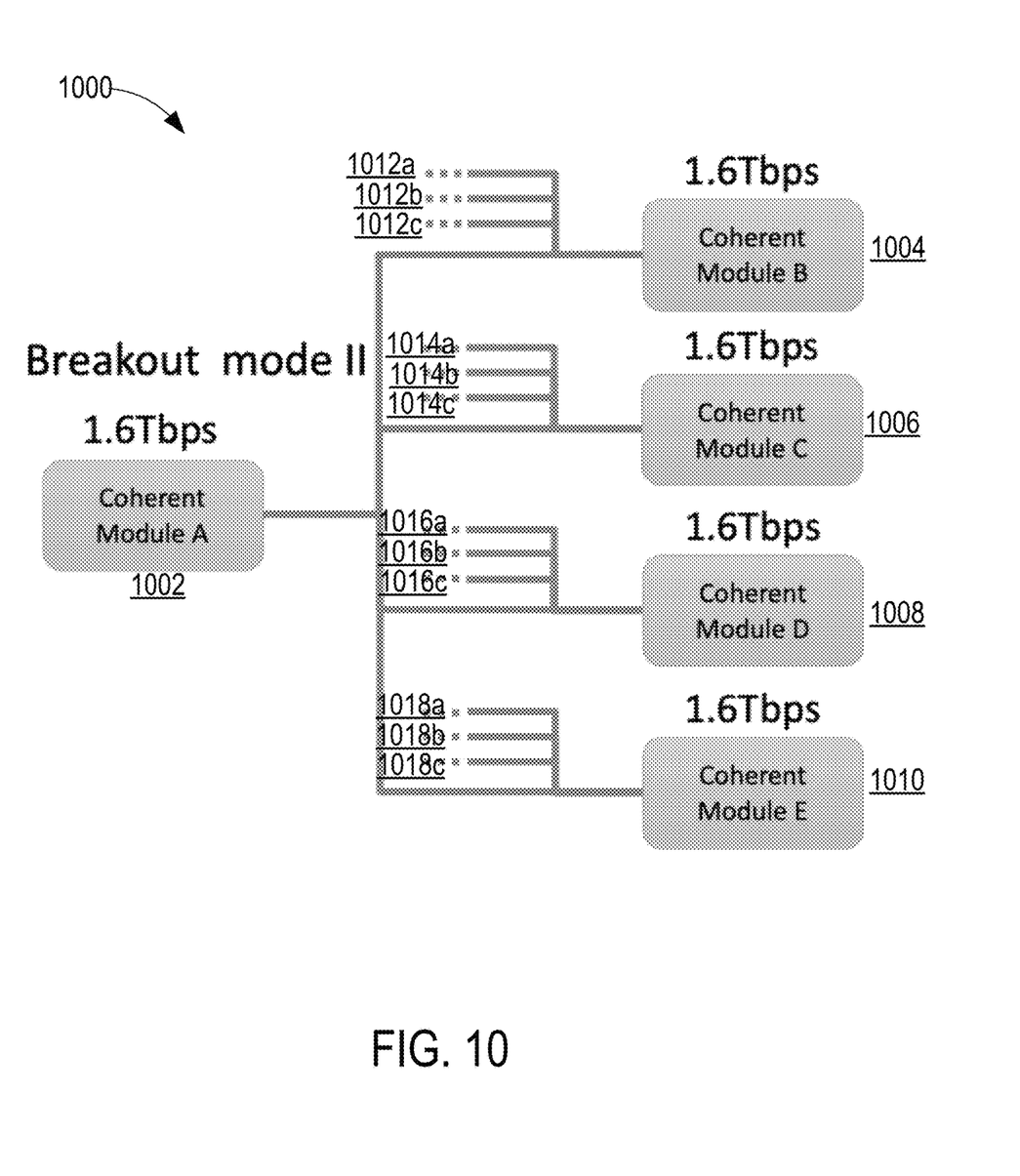
FIG. 10 is a schematic of an optical network of coherent optical modules in a second breakout mode configuration.

FIG. 9 is an optical fiber communication network 900 of a plurality of modules 902, 904, 906, 908, 910 operating in a first "breakout" mode. In a breakout mode, one module can communicate with more than one other module, e.g., a plurality of transmitters on the module can communicate with respective receivers that are located at different physical locations. For example, the module 902 can be a coherent optical module operating at 1.6 Tbps and having its communication signals broken out to the modules 904, 906, 908, 910 at 400 Gbps. FIG. 10 is an optical fiber communication network 1000 of a plurality of modules 1002, 1004, 1006, 1008, 1010 operating in a second breakout mode. For example, the module 1002 can be a coherent optical module operating at 1.6 Tbps and having its communication signals broken out to the modules 1004, 1006, 1008, 1010 at 1.6 Tbps with each of the modules 1004, 1006, 1008, 1010 being broken out to other modules 1012*a*-1012*c*. 1014*a*-1014*c*. 1016*a*-1016*c*, 1018*a*-1018*c* at 400 Gbps. Because of the links between the multiple modules in each of the breakout modes, several modules of the networks 900 or 1000 can tune and work at an edge of an operational frequency range for that network, potentially degrading performance of multiple links. For example, multiple transmitters on a module will typically share a single laser source, and the receives will typically share the laser source as well. With some or all of the modules 902-910, 1002-1018 having wavelength detectors, different modules can determine when they operate at an out of tolerance frequency, and similar remedial steps discussed above with respect to network 800 can be employed.

Figure 11:
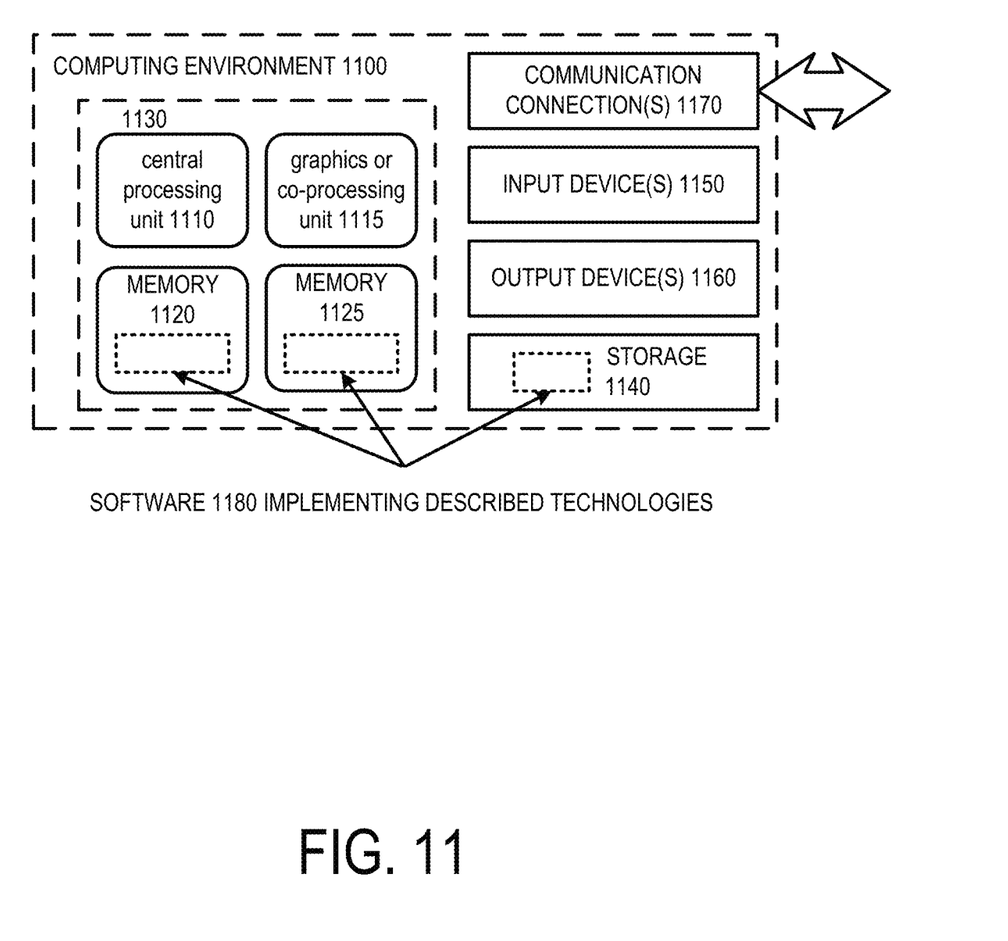
FIG. 11 depicts a generalized example of a suitable computing environment in which the described innovations may be implemented.

FIG. 11 depicts a generalized example of a suitable computing environment 1100 in which the described innovations may be implemented. The computing environment 1100 is not intended to suggest any limitation as to scope of use or functionality, as the innovations may be implemented in diverse general-purpose or special-purpose computing systems. For example, the computing environment 1100 can be any of a variety of computing devices (e.g., desktop computer, laptop computer, server computer, tablet computer, etc.).

With reference to FIG. 11, the computing environment 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s). For example, software 1180 can be configured to determine remedial actions in response to wavelength detections by coherent optical transceivers defining native or breakout optical networks.

A computing system may have additional features. For example, the computing environment 1100 includes storage 1140, one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing environment 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing environment 1100. The output device(s) 1160 may be a display, printer, speaker, CD-writer, or another device that provides output from the computing environment 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed technology may be applied, it should be recognized that the illustrated embodiments are only examples of the disclosed technology and should not be taken as limiting in scope. We therefore claim all that comes within the scope of these claims.

What is claimed is:

1. An optical communication system, comprising:
   a plurality of linked single-wavelength coherent optical transceivers configured to communicate via short-reach data-center links at a common reference wavelength, each transceiver including a single single-wavelength laser source that is used to produce a source beam at a source beam wavelength, the source beam being used to produce transmit beams sent by the transceiver and for mixing with one or more receive beams received by the transceiver;
   wherein each of the transceivers includes a thermoelectric cooler configured to control a temperature of the single-wavelength laser source around a temperature setpoint that locks the source beam wavelength to the common reference wavelength;
   wherein each transceiver includes a wavelength deviation detector configured to detect a wavelength deviation between the source beam wavelength and a wavelength or wavelengths of the one or more receive beams or between the source beam wavelength and the common reference wavelength, wherein the wavelength deviation detector is configured to detect a threshold amount of wavelength deviation that is indicative that the single-wavelength laser source is problematic or a single-wavelength laser source of a separate transceiver coupled to send the one or more receive beams is problematic, wherein each transceiver is configured to indicate the wavelength deviation or problematic characteristic in order to identify problematic laser sources and thereby prevent the linked network of transceivers from communicating at a linked network wavelength that is marginal or out-of-range in relation to the common reference wavelength.

2. A coherent optical transceiver configured to produce an optical transmit signal and to receive an optical receive signal from another coherent optical transceiver, the coherent optical transceiver, comprising:
a single-wavelength laser source configured to produce a source beam at a source beam wavelength in association with a reference wavelength, wherein the source beam is used to produce the optical transmit signal; and
a wavelength detector coupled to detect a wavelength deviation of light of the receive signal or the source beam;
wherein the transceiver is configured to determine whether the wavelength deviation is out-of-tolerance in relation to a wavelength range of operation for the coherent optical transceiver;
wherein the transceiver is configured to determine whether the wavelength deviation is out-of-tolerance in relation to a wavelength range of operation for the other coherent optical transceiver sending the receive signal.

3. The transceiver of claim 2, further comprising a thermal control system coupled to the single-wavelength laser source, wherein the thermal control system is configured to control a temperature of the single-wavelength laser source to lock the source beam wavelength to the reference wavelength.

4. The transceiver of claim 2, wherein the wavelength detector comprises a resonator evanescently coupled to receive the light and configured with a narrow linewidth situated in relation to the wavelength range.

5. The transceiver of claim 4, wherein the resonator is a micro-ring resonator.

6. The transceiver of claim 4, wherein the transceiver further comprises a heater or TEC coupled to the resonator to maintain the resonator at a fixed temperature where its resonance wavelength is matched to the reference wavelength.

7. The transceiver of claim 2, wherein the coherent optical transceiver includes a photonic integrated circuit that includes the single-wavelength laser source and the wavelength detector integrated into the photonic integrated circuit.

8. The transceiver of claim 2, wherein the wavelength detector comprises an asymmetric Mach-Zehnder interferometer configured to convert the light into a wavelength dependent output light.

9. The transceiver of claim 8, wherein waveguide material or waveguide geometry of the Mach-Zehnder interferometer is selected or optical modes are selectively coupled into the Mach-Zehnder interferometer, so as to provide an input wavelength dependent signal that is independent of temperature or to provide known thermal and wavelength sensitive responses associated with a local device temperature and input laser wavelength.

10. The transceiver of claim 8, wherein the wavelength detector further comprises one or more additional asymmetric Mach-Zehnder interferometers to form an array, wherein each of the interferometers with different parameters is tuned to detect different wavelengths or temperature ranges.

11. The transceiver of claim 3, wherein the coherent optical transceiver includes a receive digital signal processor (DSP) configured to produce a receive electrical signal from the optical receive signal, wherein the receive DSP is configured to detect a signed or non-signed absolute value of a wavelength difference between a wavelength of the optical receive signal and the source beam wavelength;
wherein the receive DSP is coupled to the thermal control system to adjust, in response to the detected wavelength difference, the source beam wavelength away from a fixed or target wavelength associated with the reference wavelength, to reduce the wavelength difference;
wherein the transceiver is configured to determine whether the wavelength deviation is out-of-tolerance in relation to a wavelength range of operation for the coherent optical transceiver or the other coherent optical transceiver sending the receive signal by comparing the detected wavelength deviation and the wavelength difference.

12. The transceiver of claim 11, wherein the coherent optical transceiver includes a receive digital signal processor (DSP) configured to produce a receive electrical signal from the optical receive signal, wherein the receive DSP is configured to detect a signed or non-signed absolute value of a wavelength difference between a wavelength of the optical receive signal and the source beam wavelength;
wherein the receive DSP is coupled to the thermal control system to adjust, in response to the detected wavelength difference, the source beam wavelength away from a fixed or target wavelength associated with the reference wavelength, to reduce the wavelength difference;
wherein the transceiver is configured to disable the adjusting of the source beam wavelength based on the wavelength difference detected by the DSP in response to a detection of an out-of-tolerance wavelength with the wavelength detector.

13. The transceiver of claim 2, wherein the wavelength detector comprises a fixed frequency optical filter situated to receive and filter the light and a photodetector coupled to receive the filtered light.

14. The transceiver of claim 2, wherein the wavelength detector comprises a beam splitter configured to optically pick-off the light.

15. The transceiver of claim 2, further comprising:
a transmit digital signal processor configured to convert an inbound electrical data signal into a modulation signal for producing an optical transmit signal; and
an optical modulator coupled to receive the modulation signal and coupled to receive and modulate the source beam with the modulation signal to produce the optical transmit signal.

16. The transceiver of claim 2, further comprising a thermoelectric cooler coupled to the laser source and configured to control a temperature of the laser source to maintain an emission wavelength of the source beam with the wavelength range.

17. One or more computer-readable media comprising computer-executable instructions that, when executed, cause a coherent optical transceiver to perform a method comprising:

producing a source beam at a source beam wavelength with a single-wavelength laser source, wherein the source beam is used to produce an optical transmit signal;

locking the source beam wavelength to a reference wavelength;

with a wavelength detector, detecting a wavelength deviation of the source beam or an optical receive signal received from another coherent optical transceiver;

determining whether the wavelength deviation is out-of-tolerance in relation to a wavelength range of operation for the coherent optical transceiver; and determining whether the wavelength deviation is out-of-tolerance in relation to a wavelength range of operation for the other coherent optical transceiver sending the receive signal.

18. The computer-readable media of claim 17, further comprising instructions that raise an alarm indicative of the out-of-tolerance condition in response to the detection.

19. The computer-readable media of claim 17, further comprising instructions that apply an initialization delay to the transceiver based on the detection so that the transceiver follows another coupled transceiver's wavelength of operation.

20. The computer-readable media of claim 17, further comprising instructions that adjust an output characteristic of the source beam in response to the detected wavelength deviation.

21. A coherent optical transceiver configured to produce an optical transmit signal and to receive an optical receive signal from another coherent optical transceiver, the coherent optical transceiver, comprising:

a single-wavelength laser source configured to produce a source beam at a source beam wavelength in association with a reference wavelength, wherein the source beam is used to produce the optical transmit signal; and a wavelength detector coupled to detect a wavelength deviation of light of the receive signal or the source beam;

wherein the transceiver is configured to determine whether the wavelength deviation is out-of-tolerance in relation to a wavelength range of operation for the coherent optical transceiver or the other coherent optical transceiver sending the receive signal;

wherein the wavelength detector comprises an asymmetric Mach-Zehnder interferometer configured to convert the light into a wavelength dependent output light;

wherein waveguide material or waveguide geometry of the Mach-Zehnder interferometer is selected or optical modes are selectively coupled into the Mach-Zehnder interferometer, so as to provide an input wavelength dependent signal that is independent of temperature or to provide known thermal and wavelength sensitive responses associated with a local device temperature and input laser wavelength.

22. A coherent optical transceiver configured to produce an optical transmit signal and to receive an optical receive signal from another coherent optical transceiver, the coherent optical transceiver, comprising:

a single-wavelength laser source configured to produce a source beam at a source beam wavelength in association with a reference wavelength, wherein the source beam is used to produce the optical transmit signal; and a wavelength detector coupled to detect a wavelength deviation of light of the receive signal or the source beam;

wherein the transceiver is configured to determine whether the wavelength deviation is out-of-tolerance in relation to a wavelength range of operation for the coherent optical transceiver or the other coherent optical transceiver sending the receive signal;

wherein the wavelength detector comprises an asymmetric Mach-Zehnder interferometer configured to convert the light into a wavelength dependent output light;

wherein the wavelength detector further comprises one or more additional asymmetric Mach-Zehnder interferometers to form an array, wherein each of the interferometers with different parameters is tuned to detect different wavelengths or temperature ranges.

23. A coherent optical transceiver configured to produce an optical transmit signal and to receive an optical receive signal from another coherent optical transceiver, the coherent optical transceiver, comprising:

a single-wavelength laser source configured to produce a source beam at a source beam wavelength in association with a reference wavelength, wherein the source beam is used to produce the optical transmit signal;

a wavelength detector coupled to detect a wavelength deviation of light of the receive signal or the source beam; and a thermal control system coupled to the single-wavelength laser source, wherein the thermal control system is configured to control a temperature of the single-wavelength laser source to lock the source beam wavelength to the reference wavelength;

wherein the transceiver is configured to determine whether the wavelength deviation is out-of-tolerance in relation to a wavelength range of operation for the coherent optical transceiver or the other coherent optical transceiver sending the receive signal;

wherein the coherent optical transceiver includes a receive digital signal processor (DSP) configured to produce a receive electrical signal from the optical receive signal, wherein the receive DSP is configured to detect a signed or non-signed absolute value of a wavelength difference between a wavelength of the optical receive signal and the source beam wavelength;

wherein the receive DSP is coupled to the thermal control system to adjust, in response to the detected wavelength difference, the source beam wavelength away from a fixed or target wavelength associated with the reference wavelength, to reduce the wavelength difference;

wherein the transceiver is configured to determine whether the wavelength deviation is out-of-tolerance in relation to a wavelength range of operation for the coherent optical transceiver or the other coherent optical transceiver sending the receive signal by comparing the detected wavelength deviation and the wavelength difference.

* * * * *